United States Patent [19]

Diachuk

[11] 4,382,807

[45] * May 10, 1983

[54] APPARATUS FOR SEPARATING FOREIGN MATTER FROM A GAS WITH A HEAT EXCHANGER

[75] Inventor: Wolodymyr Diachuk, Golden Valley, Minn.

[73] Assignee: Century 21 Pollution Control, Inc., Minneapolis, Minn.

[*] Notice: The portion of the term of this patent subsequent to Dec. 21, 1999, has been disclaimed.

[21] Appl. No.: 291,324

[22] Filed: Aug. 10, 1981

Related U.S. Application Data

[63] Continuation-in-part of Ser. No. 253,311, Apr. 13, 1981, Pat. No. 4,364,754.

[51] Int. Cl.³ .................................... B01D 45/12
[52] U.S. Cl. .................... 55/269; 55/DIG. 36; 55/456; 55/222; 55/238; 165/156; 261/79 A; 126/299 E
[58] Field of Search ............... 55/269, 80, 456, 457, 55/92, 222, DIG. 36, 235–238; 126/299 D, 299 E; 261/79 A; 165/109, 169, 156, 122

[56] References Cited

U.S. PATENT DOCUMENTS

| 1,813,343 | 8/1931 | Monroe | 165/156 |
| 2,049,708 | 8/1936 | Lieb | 165/169 |
| 2,268,386 | 12/1941 | Fisher | 165/109 |
| 2,341,319 | 2/1944 | Graham | 165/156 |
| 4,038,056 | 7/1977 | Diachuk et al. | 55/238 |
| 4,278,126 | 7/1981 | Skrzypek | 165/156 |
| 4,305,909 | 12/1981 | Willett et al. | 55/222 |

FOREIGN PATENT DOCUMENTS 1435490 5/1976 United Kingdom .................. 55/269

Primary Examiner—Bernard Nozick
Attorney, Agent, or Firm—Burd, Bartz & Gutenkauf

[57] ABSTRACT

A gas cleaning and heat transfer apparatus has a plurality of gas cleaning units that concurrently operate to separate foreign matter from the gas and reduces the temperature of the gas. Each cleaning unit has a heat conducting wall surrounding a tubular passage for carrying gas and foreign matter. A plurality of helical elements located in the passage are positioned in angular relationship relative to each other so that the gas moving through the passage is divided into separate helical gas streams. Heat from the gas in the passage is transferred through the wall to the fluid. The jacket around the cylindrical wall has a generally spiral rib in one embodiment which directs the flow of liquid in the chamber in a spiral path. The heating liquid is pumped to a location where the heat in the liquid is utilized. In another embodiment a spiral fin surrounds the heat conducting wall and a relatively airtight jacket surrounds the fin. Air cools the heat conducting wall as it circulates in the jacket. The foreign matter is separated from the gas as it moves in the spiral path through the passage by the combined mechanisms of centrifugal force, adhesion, condensation, and impaction. The cool cylindrical wall causes condensation of vapors carried by the gas on the wall to facilitate the collection of foreign matter. The collected foreign matter flowing along the wall is carried by the moving gas to an annular collecting member.

13 Claims, 21 Drawing Figures

U.S. Patent  May 10, 1983  Sheet 1 of 6  4,382,807
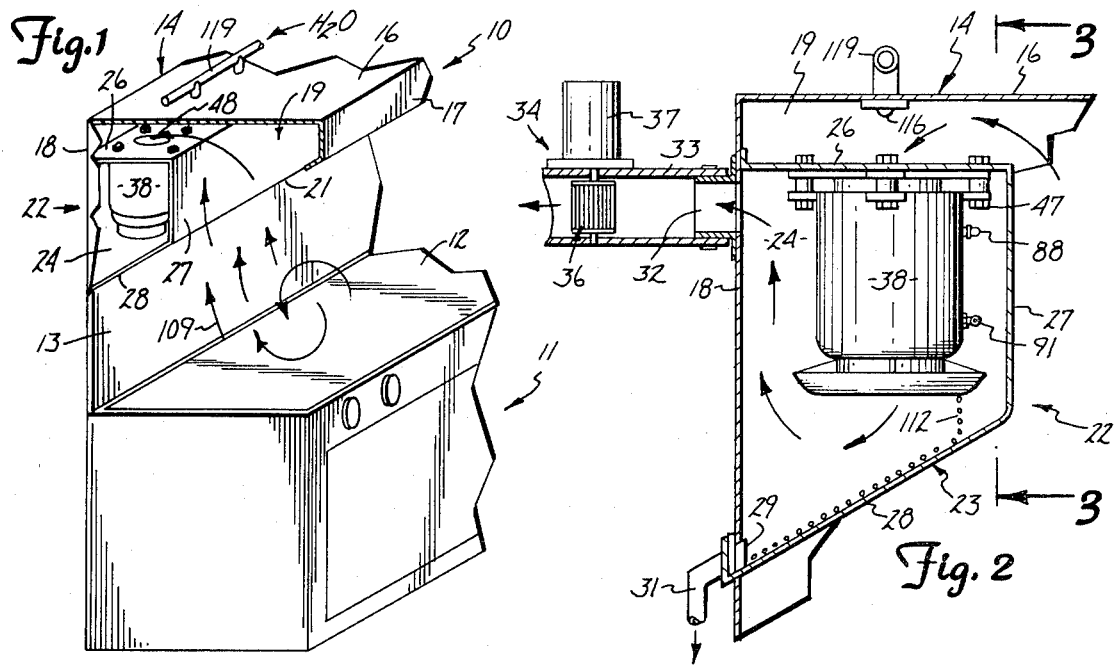
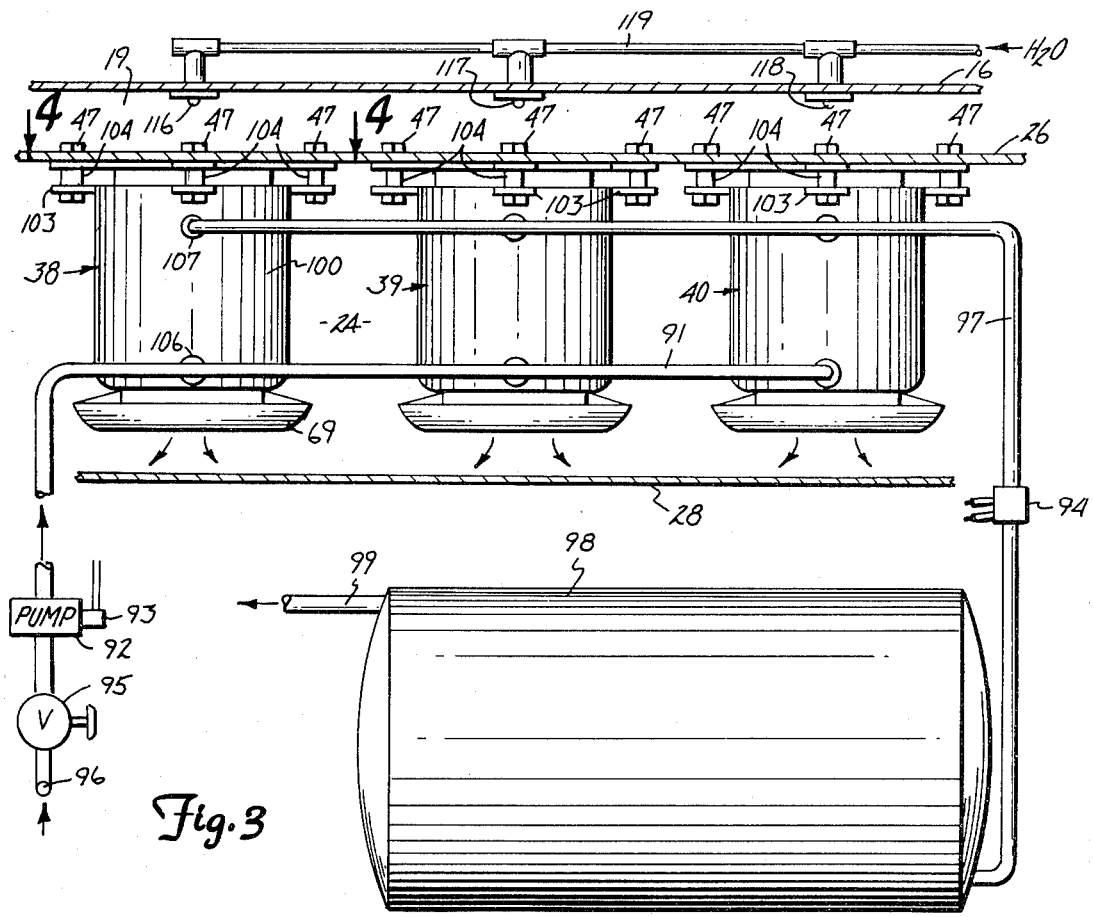

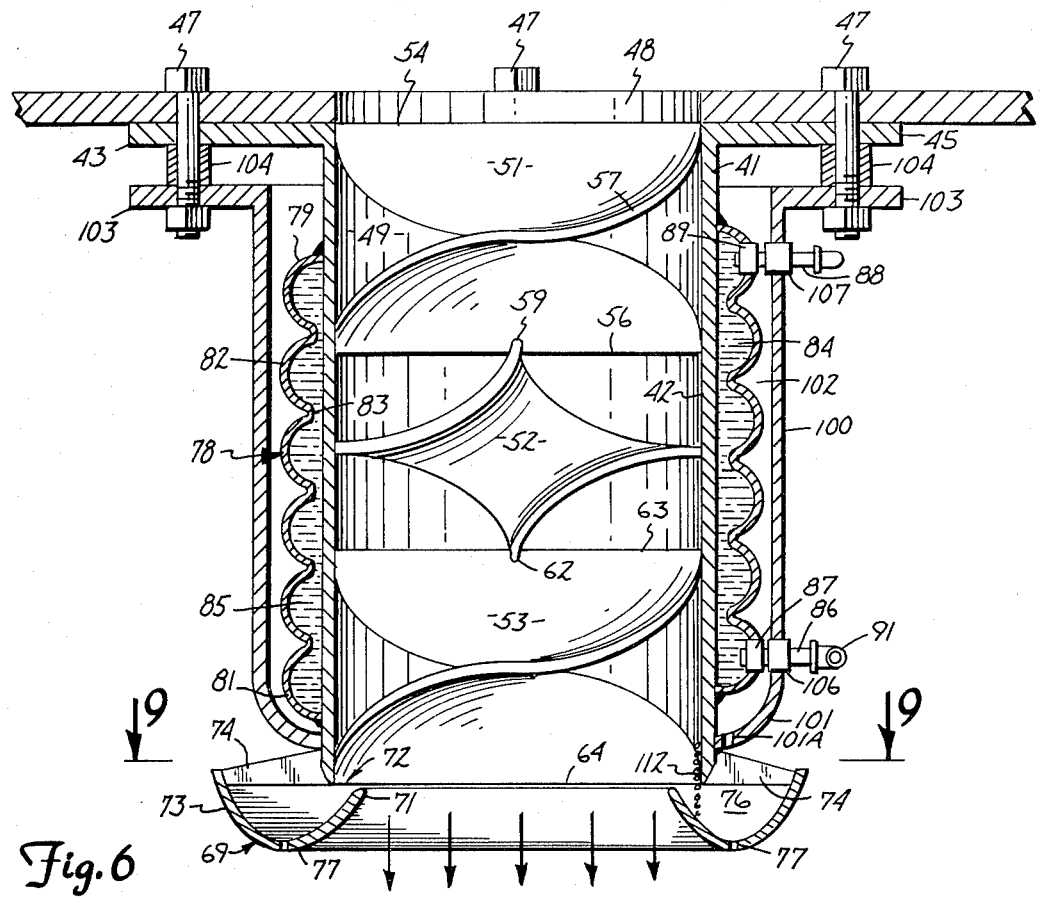
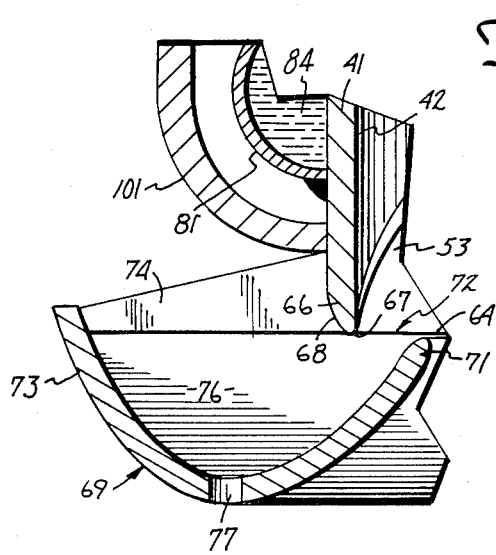
Fig.6
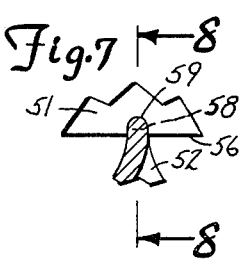
Fig.7
Fig.8
Fig.10
Fig.9

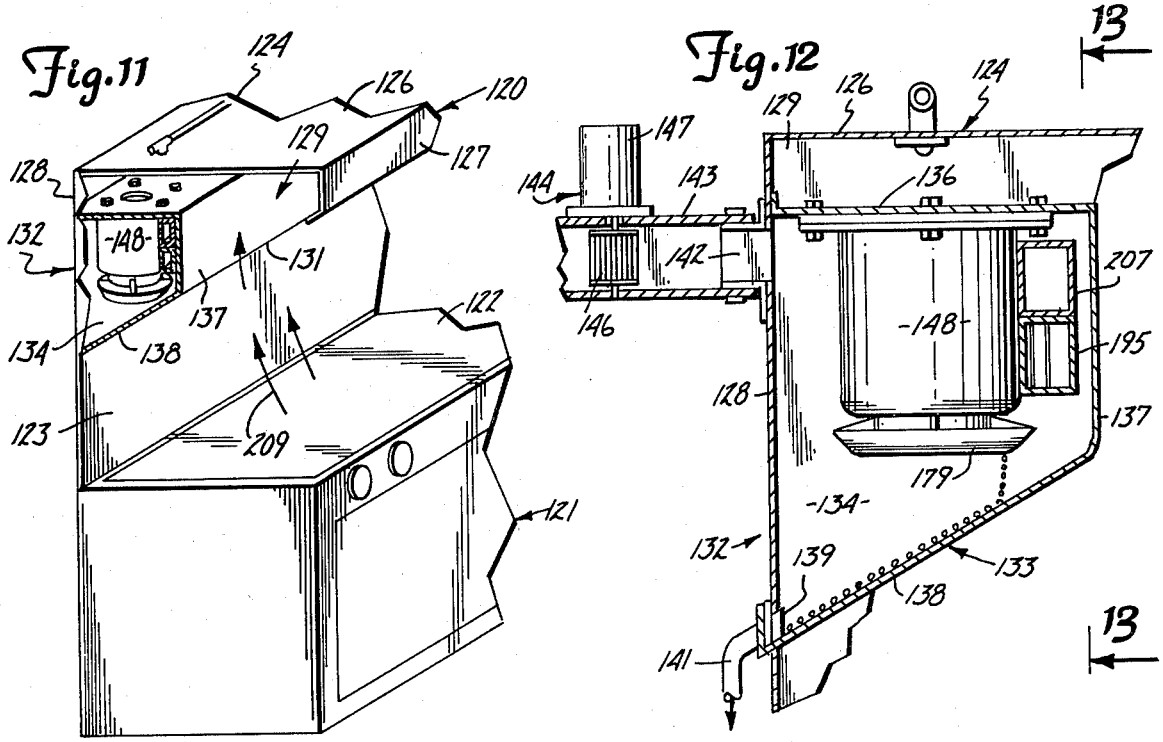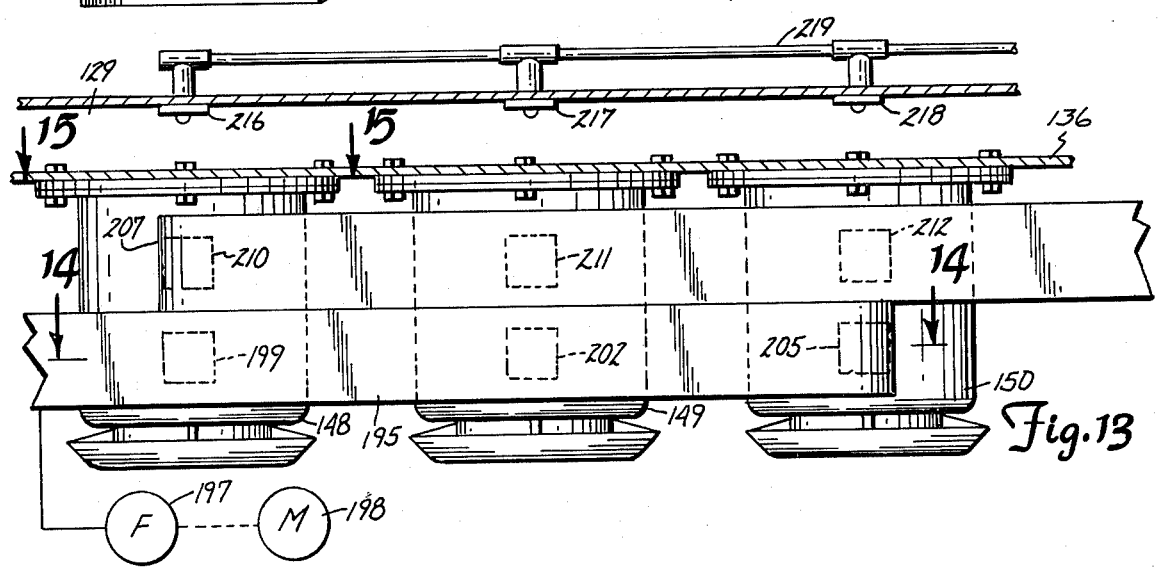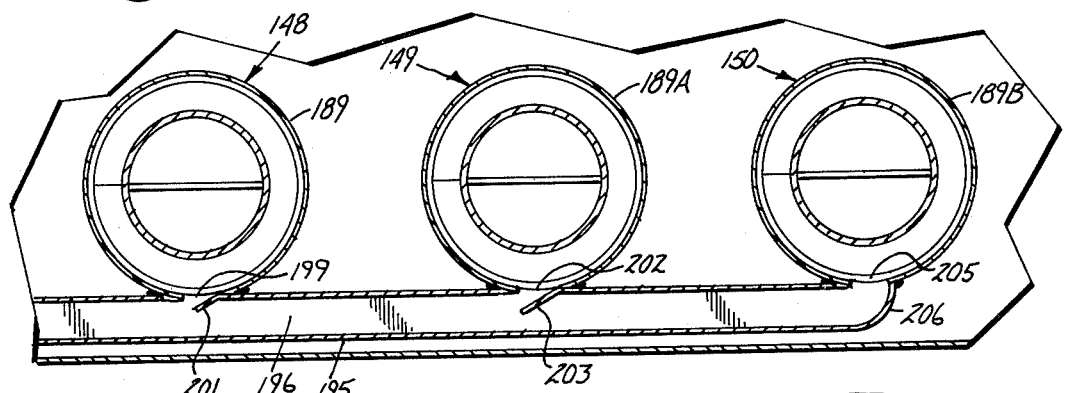

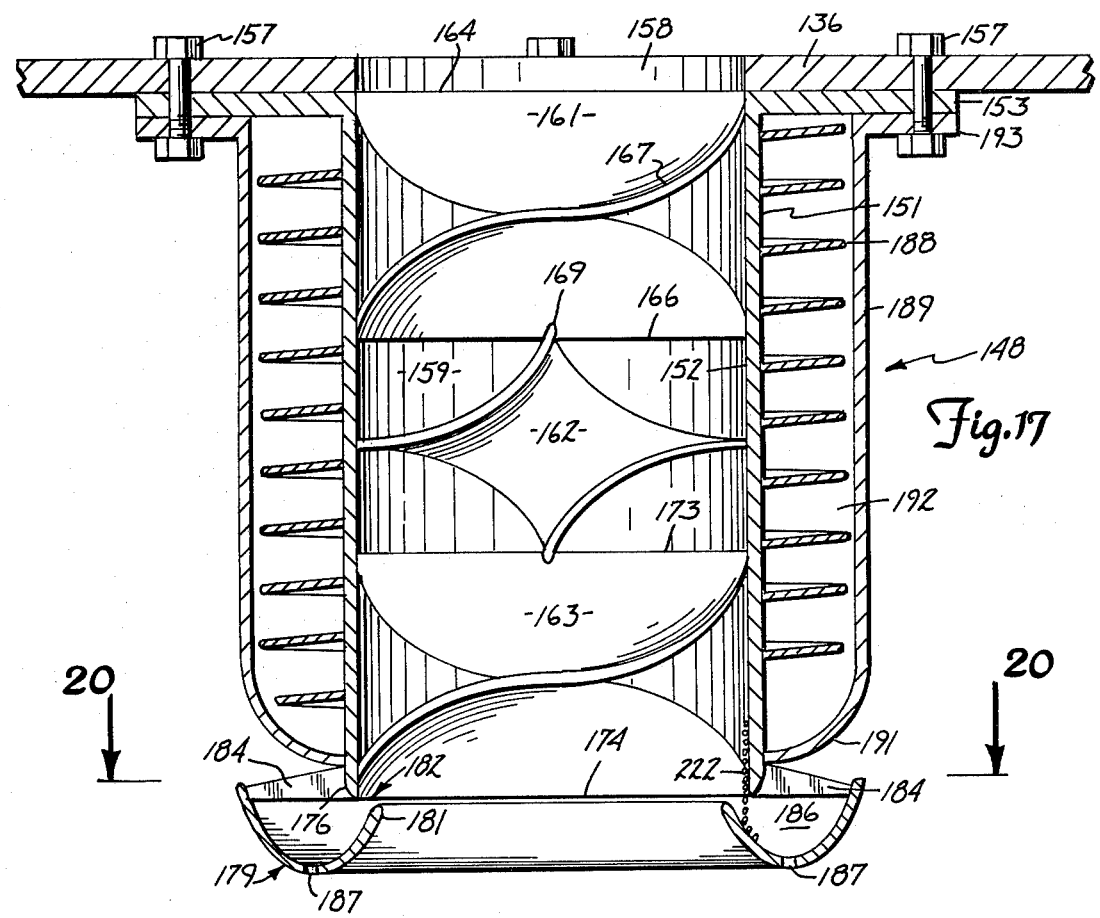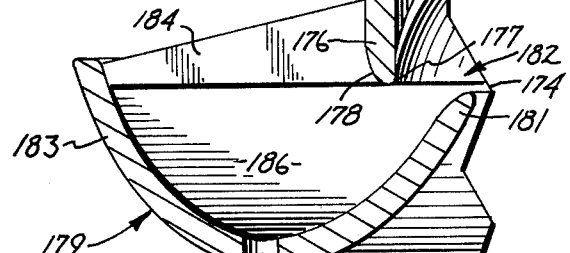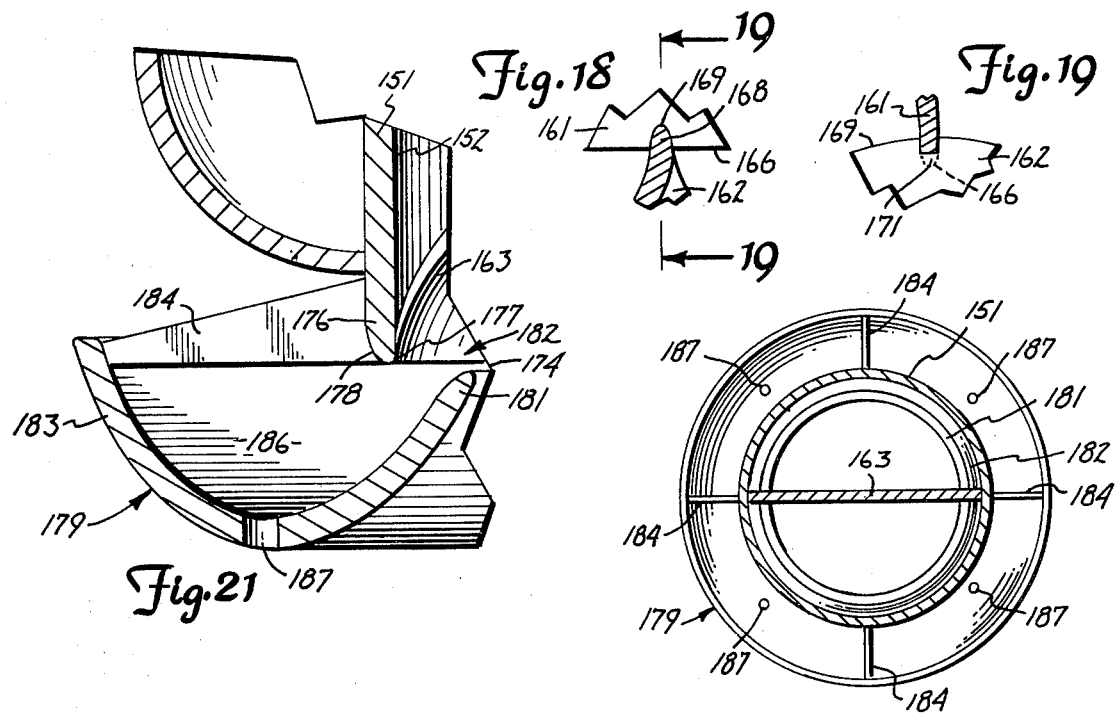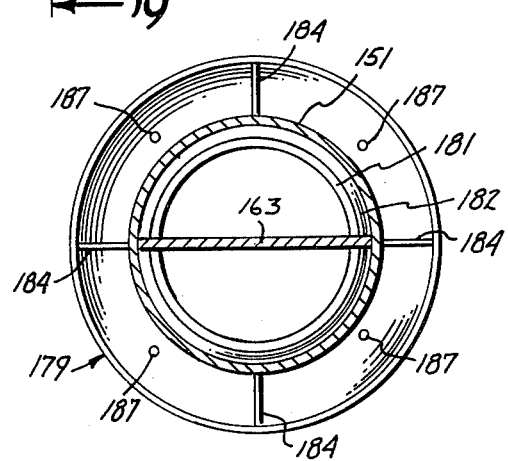

4,382,807

APPARATUS FOR SEPARATING FOREIGN MATTER FROM A GAS WITH A HEAT EXCHANGER

CROSS REFERENCE TO RELATED APPLICATION

This Application is a Continuation-In-Part of U.S. Pat. Application Ser. No. 253,311 filed Apr. 13, 1981, now U.S. Pat. No. 4,364,754.

SUMMARY OF THE INVENTION

The invention relates to a gas cleaning and heat transfer apparatus operable to separate foreign matter from a gas, such as air, and transfer heat from the gas to a liquid. The apparatus has a plurality of gas cleaning units that are useable with a hood assembly in a cooking environment for separating water, smoke, grease, and particulates and like foreign matter formed in the cooking operation from the hot gas and removing heat from the hot gas. The heat is transferred to a liquid, as water, for subsequent utilization, such as space heating or water heating. Each gas cleaning unit has a heat conducting cylindrical wall surrounding a tubular passage having a gas inlet and a gas outlet. A plurality of end-to-end helical elements located in the passage provide the gas moving through the passage with helical patterns of movement. As the ags passes the leading edge of each helical element, it is separated into separate gas streams. Each gas stream rotates about its own center as it flows in a helical path through the passage thereby causing the foreign matter to collect on the cylindrical wall.

A cylindrical jacket having a gas or liquid accommodating chamber surrounds the cylindrical wall. The fluid in the chamber contacts the cylindrical wall so that heat is transferred from the wall to the fluid. The transfer of heat through the cylindrical wall causes a reduction in the temperature of the gas flowing adjacent the inside of the wall. This causes condensation of vapors, as water, in the gas. The condensed liquid picks up smoke and particulates which are collected on the inside of the cylindrical wall. In one form of the invention the jacket is provided with a spiral rib, which facilitates helical flow of liquid in the chamber. A pump operates to move the liquid through the chamber to a location, such as a storage tank. The hot liquid can be pumped to a desired location where the heat in the liquid is utilized.

A liquid dispensing system is used in association with each gas cleaning unit to introduce a cleaning liquid or cleaning solution into the passage. The cleaning solution is carried with the gas through the passage to clean the helical elements, as well as the inside wall of the cylindrical member. The liquid dispensing system is also used as a flame extinguishing system.

IN THE DRAWINGS

FIG. 1 is a perspective view of a hood assembly equipped with a gas cleaning and heat transfer apparatus according to a first form of the invention;

FIG. 2 is a side elevational view of the gas cleaning and heat transfer apparatus with the hood assembly of FIG. 1 shown in section;

FIG. 3 is an enlarged sectional view taken along line 3—3 of FIG. 2;

FIG. 6 is a sectional view taken along line 6—6 of FIG. 4;

FIG. 7 is a fragmentary view partly sectioned of the connection between adjacent helical elements;

FIG. 8 is a sectional view taken along the line 8—8 of FIG. 7;

FIG. 9 is a reduced scale sectional view taken along the line 9—9 of FIG. 6;

FIG. 10 is an enlarged sectional view of the lower left portion of FIG. 6;

FIG. 11 is a perspective view of a hood assembly equipped with a gas cleaning and heat transfer apparatus according to a second form of the invention;

FIG. 12 is a side elevational view of the gas cleaning and heat transfer apparatus with the hood assembly of FIG. 11 shown in section;

FIG. 13 is an enlarged sectional view taken along the line 13—13 of FIG. 12;

FIG. 14 is a sectional view taken along the line 14—14 of FIG. 13;

FIG. 17 is a sectional view taken along the line 17—17 of FIG. 15;

FIG. 18 is a fragmentary view partly sectioned of the connection between adjacent helical elements;

FIG. 19 is a sectional view taken along the line 19—19 of FIG. 18;

FIG. 20 is a reduced scale sectional view taken along the line 20—20 of FIG. 17; and FIG. 21 is an enlarged sectional view of the lower left portion of FIG. 17.

DESCRIPTION OF PREFERRED EMBODIMENTS

Figure 4:
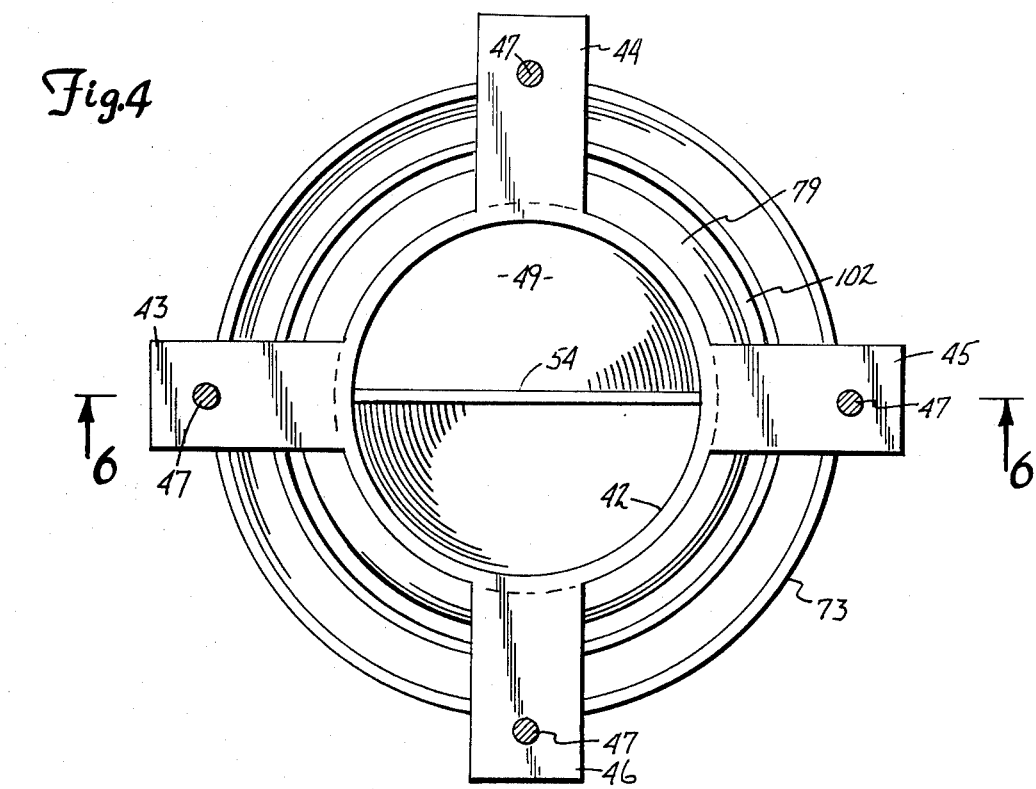
FIG. 4 is an enlarged sectional view taken along line 4—4 of FIG. 3.

Referring to FIG. 1, there is shown a hood assembly indicated generally at 10 located over a cooking unit 11 for collecting hot gases, water, smoke, grease and particulates formed in the cooking operation. Cooking unit 11 has a generally horizontal grill or flat heated plate 12. Heated plate 12 is used to cook food, such as pancakes, meat products, eggs, grits, and the like. Cooking unit 11 can be a fryer, oven, or broiler. A space 13 above grill 12 has a front opening to allow access of the cullinary personnel to grill 12. Hood assembly 10 extends over the top of space 13. Hood assembly 10 has a housing indicated generally at 14 mounted on a support (not shown), such as a wall or frame structure extended upwardly from cooking unit 11. Housing 14 has a generally flat top wall 16 joined to a downwardly directed front wall 17 and a rear wall 18. Walls 16-18 surround a chamber or passage 19 having a bottom opening 21 facing the grill 12.

A fluid cleaning assembly indicated generally at 22 located in the rear portion of passage 19 is mounted on rear wall 18. Fluid cleaning assembly 22 operates to separate foreign matter, as particulates, grease, smoke and the like foreign matter from the hot gas flowing through the assembly. Cleaning assembly 22 has a housing or casing comprising a top generally horizontal top wall 26 located below top wall 16 of the hood housing, a downwardly directed front wall 27, and a downwardly and rearwardly inclined bottom wall 28. Walls 26–28 surround a chamber 24. As shown in FIG. 2, wall 18 adjacent bottom wall 28 has an outlet or drain port 29 through which liquid and liquid-like materials separated from the gas in cleaning assembly 22 flow from chamber 24 and drain to a discharge tube 31. Tube 31 leads to a collection can or container (not shown). The upper portion of housing 22 has a gas outlet port or passage 32 leading to a duct 33 for carrying gas, such as air, to a desired location. Gas moving means indicated generally at 34 functions to draw gas through chamber 24 and discharge the gas through duct 33. Gas moving means 34 is diagrammatically shown as a rotating fan or blower 36 driven by electric motor 37. Other types of gas moving units, such as one or more motor driven blower units, can be used to draw gas through chamber 24.

As shown in FIG. 3, a plurality of gas cleaning units 38, 39 and 40 are located in chamber 24. The number of gas cleaning units in chamber 24 can vary in accordance with the length of the chamber. Gas cleaning units 38–40 are identical in construction. The following description is directed to cleaning unit 38, as shown in FIG. 4–9. Gas cleaning unit 38 has an interior cylindrical casing or tube 41 having an inside cylindrical surface 42. Tube 41 has a heat conducting cylindrical wall of metal, such as stainless steel, copper or the like. A plurality of outwardly directed arms 43, 44, 45 and 46 are secured to the upper end of tube 41. Nut and bolt assemblies 47 secure the arms 43–46 to top wall 26.

Referring to FIG. 6, top wall 26 has a cylindrical hole or opening 48 aligned with the cylindrical passage 49 formed by the inside surface 42 of tube 41. A plurality of end-to-end helical elements 51, 52 and 53 are located in passage 49. First helical element 51 has a leading transverse edge 54 located below opening 48 in wall 26. Element 51 has a 180 degree twist with a trailing transverse edge 56 located in generally the same vertical plane as the leading edge 54. Element 51 has an outer helical edge 57 that is located in engagement with the inside cylindrical surface 42 of tube 41. The trailing edge 56 has a center notch 58 accommodating a notch 61 in leading edge 59 of helical element 52. As shown in FIG. 7, leading edge 59 has a rounded or semicircular shape. FIG. 8 shows the trailing edge 56 as having a converging or feathered shape. Leading edge 59 of second element 52 is oriented 90 degrees relative to the trailing edge 56 of first element 51. Second element 52 has a trailing edge 62 that is circumferentially oriented 90 degrees relative to a leading edge 63 of the third element 53. Third element 53 has a lower transverse edge 64 located and generally aligned with the lower end of tube 41. Helical elements 51, 52 and 53 have the same twist or helical turn. They are circumferentially oriented 90 degrees relative to each other so that, as the gas, smoke, water and particulates entrained in gas move through passage 49, the gas stream is divided into separate helical streams. The centrifugal forces on the smoke and particulates carried by the gas are separated from the gas and collected on the inside surface 42. The particulates and water will flow down with the moving gas to the lower or exit end 66 of tube 41. The longitudinal length of each helical element is about one and one-half times the diameter of the element. Other size relationships between the length and diameter of the helical elements can be used. Helical elements 51, 52 and 53 can have twists other than 180 degrees. For example, twists of 30 degrees, 45 degrees, 60 degrees, 90 degrees, 120 degrees, 150 degrees and others can be used for each helical element. The number of helical elements in each tube varies with the length of the tube.

An annular member or material collecting ring indicated generally at 69 is located adjacent the lower or exit end of tube 41. Member 69 has an inner end 71 spaced inwardly from the exit end 66 of tube 41 providing therewith an annular throat 72, as shown in FIGS. 6, 9 and 10. As shown in FIG. 10, inner end 71 is located a short distance below the lower end 67 of tube 41. End 71 has a convex curved shape to minimize turbulence and gas pressure build-up in the throat or annular passage 72. End 67 has a convex curved shape and an arcuate outside portion 68. Portion 68 provides a smooth, curved surface joined to the outside surface of tube 41 and eliminates a sharp outer edge which causes turbulence and an obstruction to gas flow through annular pocket passage 76. Member 69 has an upwardly and outwardly curved outer end 73 spaced outwardly from end 66 of tube 41. A plurality of connecting members or plates 74 secure annular member 69 to tube 41. The mid-portion of annular member 69 has a plurality of holes 77 which allow the liquids and fluid-like materials collected in annular pocket or recess 76 to drain onto bottom wall 28. A tubular member or pipe can be directly connected to annular member 69 to carry the liquids and fluid-like materials to a storage container.

Figure 5:
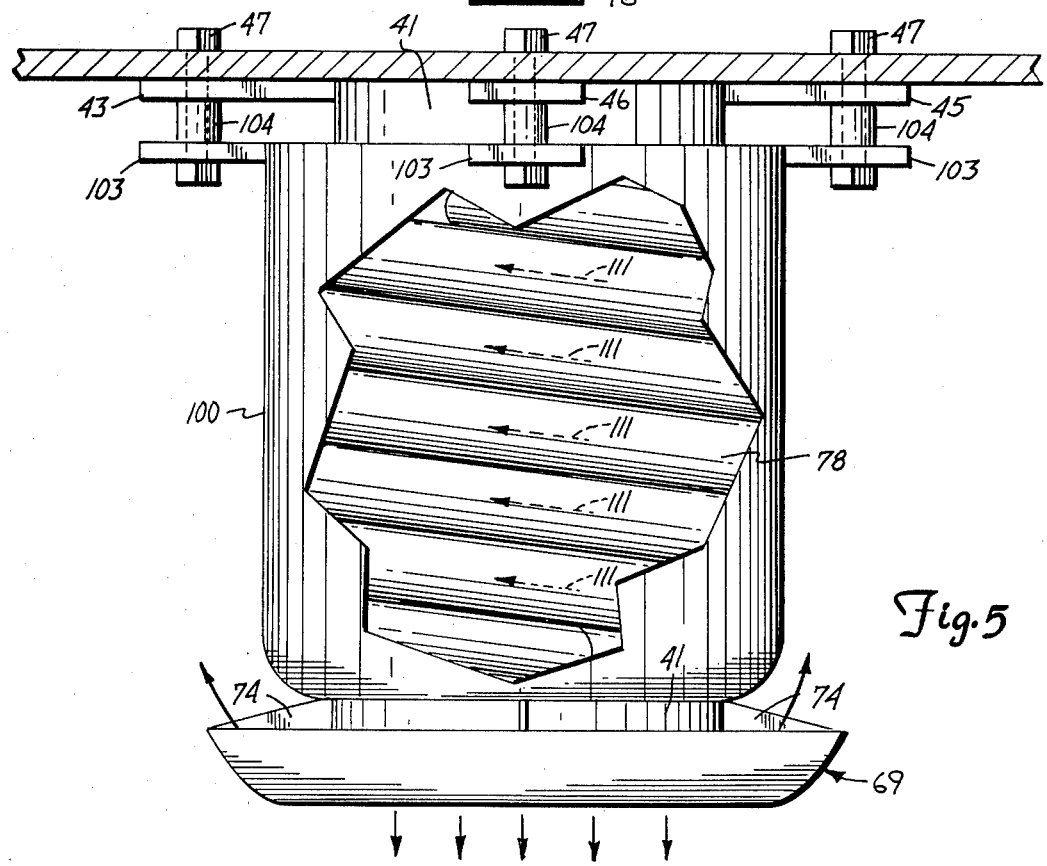
FIG. 5 is a side elevational view of the gas cleaning and heat transfer apparatus of FIG. 3 with parts broken away to show the inside jacket.
Figure 15:
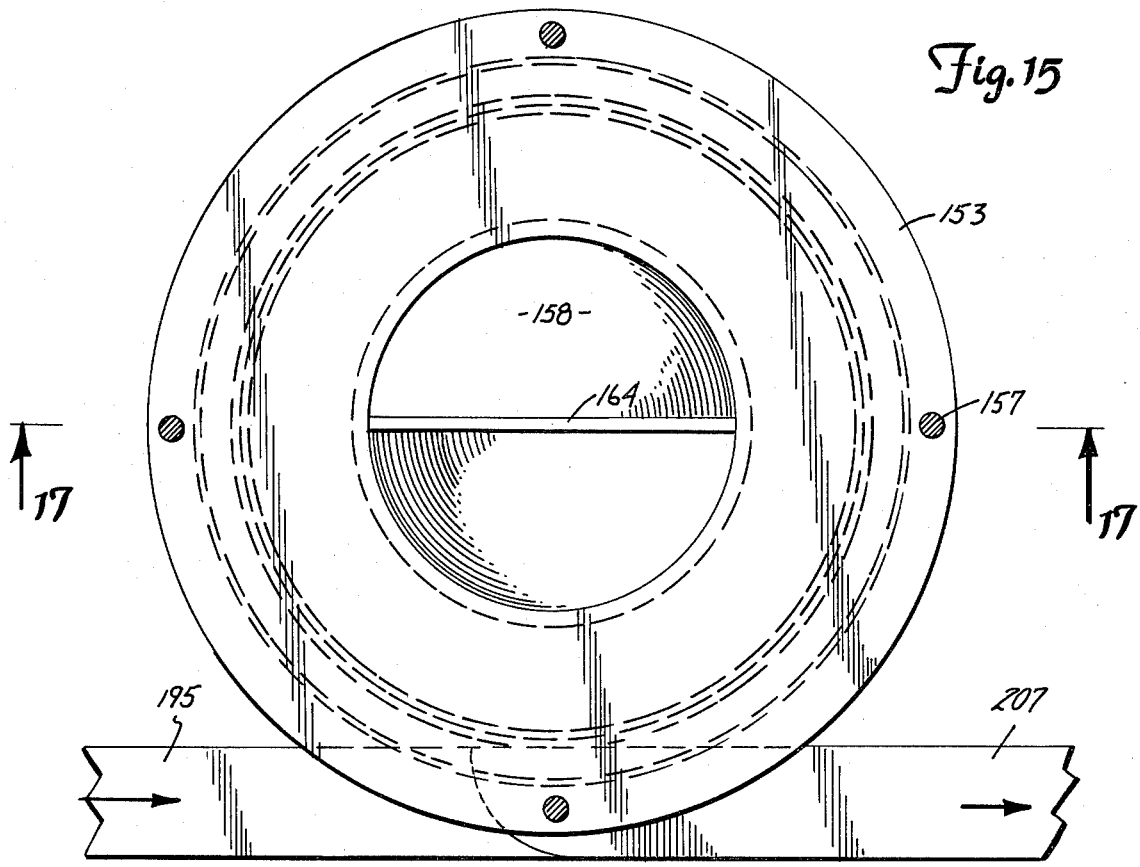
FIG. 15 is an enlarged sectional view taken along the line 15—15 of FIG. 13.

As shown in FIGS. 5 and 6, a cylindrical jacket 78 surrounds tube 41. Jacket 78 has an upper end 79 and a lower end 81 secured by welds or the like to the outer surface of tube 41. A spiral or helical-shaped side wall 82 extends between upper end 79 and lower end 81. Side wall 82 has an inwardly directed spiral rib 83 that is located close to the outside wall of tube 41 and a spiral passage 84 accommodating a liquid 85, as water, ethylene glycol and the like. Tube 41, being metal, transmits heat from the hot gas moving through passage 49 to liquid 85. A copper spiral tube carrying water can be wound around tube 41 to pick up heat from the tube 41.

As shown in FIG. 6, a connector 87 joins a liquid inlet tube 86 through a liquid inlet pipe or manifold 91. Pipe 91 extends adjacent cleaning units 38, 39 and 40 and feeds liquid to the units. Returning to FIG. 3, a pump 92 driven by an electric motor 93 functions to regulate the flow of liquid through the spiral passage 84. Motor 93 is connected to a thermostatically responsive control 94 whereby the speed of motor 93 is regulated in response to the temperature of the liquid flowing from the cleaning units 38, 39 and 40. An on-off valve 95 in the inlet supply pipe 96 is used to manually control the flow of liquid in the system. The on-off valve 95 can be used in lieu of the pump 92 to provide manual control for the flow of liquid through the liquid carrying passages 84 of cleaning units 38–40.

Returning to FIG. 6, the upper end of side wall 82 carries an outlet connector 89 joining a liquid outlet tube 88 through an outlet pipe or tubular member 97. Pipe 97 is connected to each of the upper ends of each of the cleaning units 38–40 and leads to a storage tank 98 used to store the hot liquid. An outlet tube or pipe 99 connected to tank 98 carries the hot liquid to a selected location, such as heating radiators or a hot water supply system.

A sleeve 100 surrounding jacket 78 provides insulating means or a heat barrier. Sleeve 100 is an elongated cylindrical member that is preferably of heat insulating material, such as ceramic or brick. Sleeve 100 may be a metal member. Sleeve 100 has a lower inwardly turned end 101 that engages the lower end of tube 41. End 101 has one or more drain holes 101A allowing liquid to drain from space 102 into pocket 76. The upper end of sleeve 100 has outwardly directed flanges or ears 103 that accommodate the nut and bolt assemblies 47. Spacers 104 surrounding the nut and bolt assemblies 47 separate ears 103 from arms 43–46 and transmit the clamping force of the nut and bolt assembly 47 to both arms 43–46 and ears 103. Sleeve 100 has a diameter greater than the diameter of the side wall 82 and forms therewith an annular air space 102. The air space 102 and sleeve 100 serve as a heat barrier to minimize the transfer of heat from the side wall 82 into the air moving through chamber 24. Grommets 106 and 107 mounted in holes on sleeve 100 accommodate liquid inlet tube 86 and liquid outlet tube 88.

Returning to FIG. 3, a liquid, as water, is dispensed into the passage 19 above each of the openings 48. The liquid can be a cleaning solution, such as a detergent or sanitizer, used to wash the helical elements and cylindrical inside wall 42. The liquid can also be used to control the temperature of the gas flowing through the cleaning units 38, 39 and 40 and extinguish any fire in the cleaning units. The liquid is dispensed through nozzles 116, 117 and 118 mounted on the hood top wall 16. Each nozzle 116, 117 and 118 is connected to a manifold or feed pipe 119 leading to a source of liquid under pressure. Pipe 119 is connected to suitable controls, including valves (not shown), which can be operated to control the flow of liquid in pipe 119. The liquid is subjected to pressure so that if flows through the nozzles 116, 117 and 118 and is dispensed as a spray or mist into the passages 49 of tubes 41.

In use, gas moving means 34 is operated by motor 37 to move gas through the hood assembly 10 and discharge clean gas to a desired location, such as a gas treating module or the environment surrounding the cooking unit. The gas, as shown in FIG. 1, is moved from space 13 above grill 12, as indicated by the arrows 109, into passage 19 of hood assembly 10. The moving gas picks up the foreign matter, such as water, particulates, grease, smoke and odors generated by cooking food products on grill 12. The foreign matter is entrained in the gas and are moved with the gas through the openings 48 in the top wall 26 of fluid cleaning assembly 22.

Referring to FIG. 6, the gas moves down through the cylindrical passage 49 of tube 41. Helical elements 51, 52, and 53, being oriented 90 degrees with respect to each other, divide the gas stream into separate gas streams. The leading edge of each element divides the gas stream into two separate gas streams. The twist of the helical element causes the gas to move in spiral flow patterns. This subjects the foreign matter carried by the gas to centrifugal force causing the foreign matter to move outwardly against the cylindrical surface 42 of tube 41. At each succeeding helical element, the air streams are further divided. The number of air stream divisions produced is 2n, where n is the number of helical elements.

The geometry of the helical twist of the helical elements 51, 52 and 53 produce rotational circulation of the gas stream about the pneumatic axis of each helical gas stream. This produces additional centrifugal force on the foreign matter, driving the foreign matter into engagement with the inside surface 42.

The gas moving through passage 49 is at a temperature above the atmospheric temperature due to the heat from the grill 12. Part of the heat in the gas is transferred to tube 41. This results in a drop in the temperature of the gas and an increase in the temperature of the tube 41. Tube 41 is cooled by liquid 85 in the helical passage 84. The cool tube 41 enhances the transfer of heat from the gas through tube 41 and to liquid 85. When the particulates, water vapors, and the like approach and contact cool tube 41, they condense and merge into liquid droplets, which are collected on surface 42. The condensation is caused by a drop in the temperature of the gas and foreign matter in the gas adjacent the inside surface 42 of tube 41. The centrifugal force acting on the foreign matter concentrates the foreign matter adjacent the inside surface 42 of tube 41 and facilitates the condensation process.

The gas cleaning unit 38 utilizes a number of mechanisms to remove the foreign matter from the air. The mechanisms include the centrifugal force, gravity, inertial compaction, direct interception, absorption, and coagulation. These mechanisms function in conjunction with the condensation of gases into liquids caused by the cool tube 41. Liquids and particles, along with the condensed liquid droplets, will collect on the inside surface 42 and flow downwardly to material collector ring 69. The dry particles, as dust and smoke, will be moved under the influence of centrifugal force into engagement with the inside surface 42 and mix and impinge on the liquid droplets. The liquid droplets function as an adhesive or collective agents which retains the dry particulates and remove the particulates and smoke from the gas stream. Odor molecules, pollens, and the like will also impinge and adhere to the collected liquid droplets.

Material collecting ring 69 functions to catch the collected foreign matter as it leaves the lower end of tube 41. An annular sheath of gas moves through annular throat 72 between the inlet end or lip 71 of annular ring 69 and the lower edge 66 of tube 41. This accelerates the gas and carries collected matter 112 down into pocket 76 of ring 69. The collected matter, being liquid or semi-liquid, flows through holes 77 and along bottom wall 28 through drain hole 29. Tube 31 carries the collected foreign matter to a collection container. As shown in FIG. 10, pocket 76 located between collecting ring 69 and lower end 67 of tube 41 increases in width from throat 72. This causes a reduction in the speed of the gas flow, which enhances the retention of the foreign matter in pocket 76. The cooled and clean gas in the central portion of passage 49 flows through the center hole in ring 69 and is drawn by gas moving means 34 through exit passage 32 and discharged in a desired location.

Pump 92 driven by motor 93 delivers liquid, such as water, to spiral passage 84 of jacket 78 of each gas cleaning unit. The liquid moves in a spiral pattern, as shown by arrows 111 in FIG. 5. As the liquid moves over the outside surface of tube 41, it picks up the heat from the tube 41 thereby lowering the temperature of tube 41 and gas in the passage 49. The heated liquid is carried by return pipe 97 to storage tank 98. The heated liquid in tank 98 is useable for heating and cleaning purposes. For example, the heated liquid in tank 98 can be directed to a dishwasher. The liquid circulating system, being a closed system, is not subjected to contamination which would reduce the utility of the heated liquid.

Referring to FIG. 11 there is shown a hood assembly indicated generally at 120 having a gas cleaning and heat transfer apparatus according to a second form of the invention. Hood 120 is poised over a cooking unit 121 for collecting hot gases, water, smoke, grease and particulates formed in a cooking procedure. Cooking unit 121 has a generally horizontal grill 122. Grill 122 is used to cook food, such as pancakes, meat products, eggs and the like. A space 123 above grill 122 permits access to the grill by cullinary personnel. Hood assembly 120 extends over the top of space 123. Hood assembly 120 has a housing indicated generally at 124 mounted on a support (not shown), such as a wall or frame structure extended upwardly from cooking unit 121. Housing 124 has a generally flat top wall 126 joined to a downwardly directed front wall 127 and a rear wall 128. Walls 126–128 surround a chamber or passage 129 having a bottom opening 131 in facing relationship to grill 122.

A fluid cleaning assembly indicated generally at 132 located in the rear portion of passage 129 is mounted on rear wall 128. Fluid cleaning assembly 132 operates to separate foreign matter from the hot gas flowing through the assembly. Fluid cleaning assembly 132 has a housing or casing 133 comprising a generally horizontal top wall 136 located below the top wall 126 of the hood housing, a downwardly directed front wall 137, and a downwardly and rearwardly inclined bottom wall 138. Walls 136–138 surround a chamber 134. As shown in FIG. 12, wall 128 adjacent bottom wall 138 has an outlet or drain port 139 through which liquid and liquid-like materials separated from the gas in cleaning assembly 132 flow from chamber 134 to a discharge tube 141. Tube 141 leads to a collection facility (not shown). The upper portion of housing 132 has a gas outlet port or passage 142 leading to a duct 143 for carrying gas, such as air, to a desired location. Gas moving means indicated at 144 functions to draw gas through chamber 134 and discharge the gas through duct 143. Gas moving means 144 is shown to include a blower 146 driven by an electric motor 147.

As shown in FIG. 13, a plurality of gas cleaning units 148, 149 and 150 are located in chamber 134 and can be identical in construction whereby the following description is limited to cleaning unit 148, as shown in FIGS. 15–20. Gas cleaning unit 148 has an interior cylindrical casing or tube 151 having an inside cylindrical surface 152. Tube 151 has a heat conducting cylindrical wall of metal, such as stainless steel, copper or the like. Tube 151 has an outwardly directed, uninterrupted radial flange 153 disposed along the upper edge thereof. Flange 153 is secured to the top wall 136 by a plurality of nut and bolt assemblies 157.

Referring to FIG. 17, top wall 136 has a cylindrical hole or opening 158 aligned with the cylindrical passage 159 formed by the inside surface 152 of tube 151. A plurality of end-to-end helical elements 161, 162 and 163 are located in passage 159. First helical element 161 has a leading transverse edge 164 located below opening 158 in wall 136. Element 161 has a 180 degree twist with a trailing transverse edge 166 located in generally the same vertical plane as the leading edge 164. Element 161 has an outer helical edge 167 that is located in engagement with the inside cylindrical surface 152 of tube 151. The trailing edge 166 has a center notch 168 accommodating a notch 171 in leading edge 169 of next helical element 162. As shown in FIG. 18, leading edge 169 has a rounded or semicircular shape. FIG. 19 shows the trailing edge 166 as having a converging or feathered shape. Leading edge 169 of second element 162 is oriented 90 degrees relative to the trailing edge 166 of first element 161. Second element 162 has a trailing edge 172 that is circumferentially oriented 90 degrees relative to a leading edge 173 of the third element 163. Third element 163 has a lower transverse edge 174 located and generally aligned with the lower end of tube 151. Helical elements 161, 162 and 163 have the same twist or helical turn. They are circumferentially oriented 90 degrees relative to each other so that as the gas, smoke, water and particulates entrained in gas move through passage 159, the gas stream is divided into separate helical streams. The centrifugal forces on the smoke and particulates carried by the gas are separated from the gas and collected on the inside surface 152. The particulates and water will flow down with the moving gas to the lower or exit end 176 of tube 151. The longitudinal length of each helical element can be about 1 and 1/2 times the diameter of the element.

An annular member or material collecting ring indicated generally at 179 is located adjacent the lower or exit end of tube 151. Member 179 has an inner end 181 spaced inwardly from the exit end 176 of tube 151 providing therewith an annular throat 182, as shown in FIGS. 19, 20 and 21. As shown in FIG. 21, inner end 181 is located a short distance below the lower end 177 of tube 151. End 181 has a convex curved shape to minimize turbulence and gas pressure build-up in the throat or annular passage 182. End 177 has a convex curved shape and an arcuate outside portion 178. Portion 178 provides a smooth curved surface joined to the outside surface of tube 151 and eliminates a sharp outer edge which causes turbulence and an obstruction to gas flow through annular pocket passage 186. Member 179 has an upwardly and outwardly curved outer end 183 spaced outwardly from end 176 of tube 151. A plurality of connecting members or plates 184 secure annular member 179 to tube 151. The mid-portion of annular member 179 has a plurality of holes 187 which allow the liquids and fluid-like materials collected in annular pocket or recess 186 to drain onto bottom wall 138.

Figure 16:
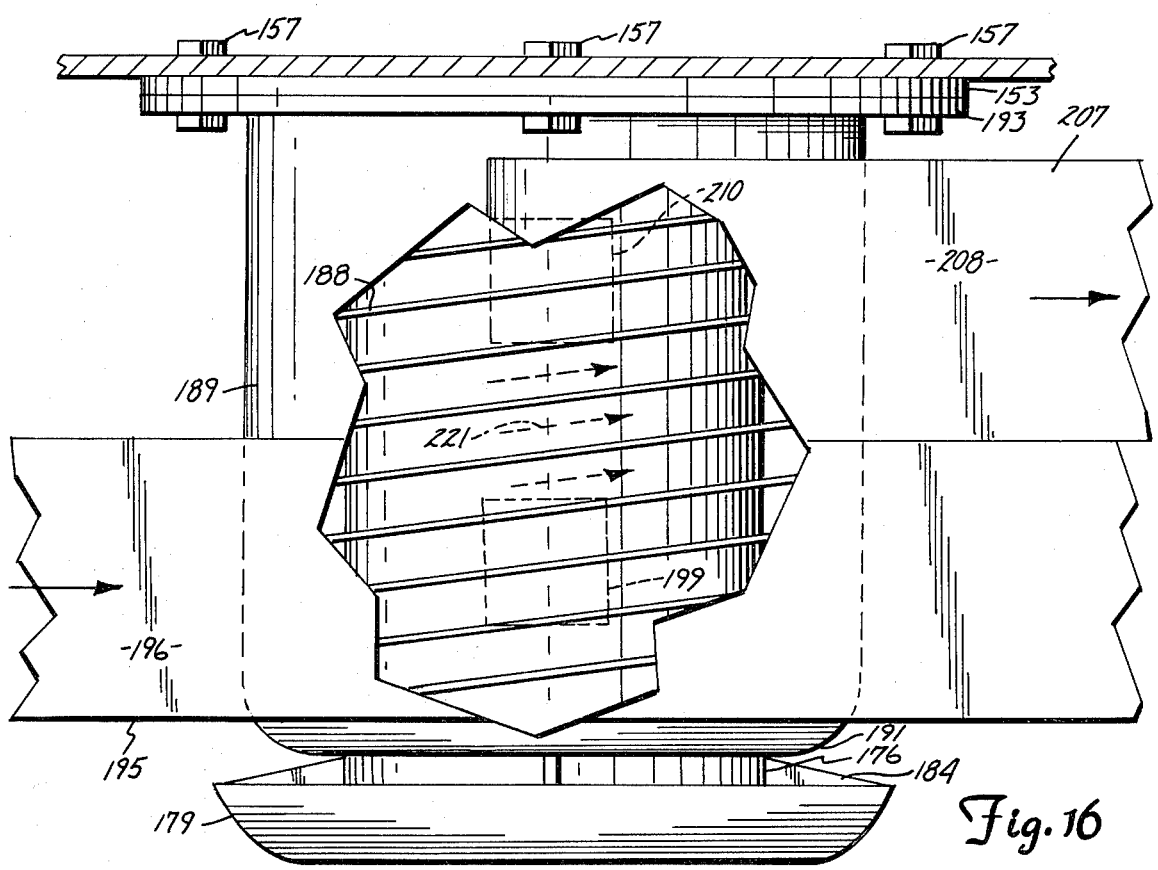
FIG. 16 is a side elevational view of the gas cleaning and heat transfer apparatus of FIG. 13 with parts broken away to show the inside jacket.

As shown by FIGS. 16 and 17, a continuous spiral vane or helical fin 188 surrounds tube 151 and is connected thereto by suitable means such as welds. Fin 188 has a circular outer edge. The outer edge can be square to fit in a square passage. Fin 188 is preferably formed of a suitable high heat conductive metal. Fin 188 transmits heat from tube 151 and the hot gas moving through passage 159. A sleeve or jacket 189 surrounds fin 188 to provide a relatively airtight chamber 192 and a heat barrier. Jacket 189 is an elongated cylindrical member that is preferably of heat insulating materials such as ceramic, brick, or even metal. The inside surface of jacket 189 is spaced slightly from the outer peripheral edge of fin 188. Jacket 189 has a lower inwardly turned end 191 that engages the lower end of tube 41 in relatively airtight relationship. The chamber 192 is formed between sleeve 189 and tube 151. An outwardly directed radial flange 193 extends outwardly from the upper end of sleeve 189 and is in flush contact with the lower surface of flange 153 on tube 151. The nut and bolt assemblies 157 hold the flange 193 of sleeve 189 in relatively airtight relationship to the flange 153 of tube 151.

As shown in FIGS. 13 and 14, an air inlet duct 195 is provided to supply air or other suitble fluid to chamber 192 of jacket 189 of gas cleaning unit 149, as well as to the jackets 189A, 189B of gas cleaning units 149, 150. Inlet duct 195 has a generally linear air passage 196 wherein air is moved by suitable means such as a fan 197 driven by a motor 198. Jacket 189 has an air tight opening 199 located in the lower portion thereof. A deflector 201 is positioned adjacent air inlet opening 199 slightly downstream thereof and extends into the stream of passage 196. Deflector 201 deflects a portion of the air passing through the passage 196 into the jacket 189 through the opening 199.

In like fashion, jacket 189A of second gas cleaning unit 149 has an inlet opening 202 in the lower portion thereof. A deflector 203 extends from the downstream edge of opening 202 into the stream of passage 196. Deflector 203 extends slightly further into passage 196 than the first deflector 201 and is operative to deflect another portion of the stream of air passing through the passage 196 into the jacket 189A through the opening 202. Third gas cleaning unit 150 has an opening 205 in the lower portion thereof through the jacket 189B. Duct 195 has a rounded end 206 terminating adjacent the downstream edge of the opening 205 whereby the remaining air passing in passage 196 is deflected through the opening 205 into the jacket 189B.

An exhaust duct 207 provides a linear exhaust passage for exhaust of air from the upper part of gas cleaning units 148 - 150. Exhaust duct 207 is connected to an exhaust opening in jacket 189 indicated at 210 in FIG. 16 to carry air exhaust therefrom to a place of use or disposal, as for example, for warming a room. Exhaust duct 207 in like fashion connects with suitably provided exhaust openings on the remaining air cleaning units 149, 150. Exhaust opening 210 is located vertically above inlet opening 199 on jacket 189.

Air is driven by fan 197 through inlet duct 195 entering in gas cleaning units 148, 149, 150 through inlet openings 199, 202, 205. Deflector 201 deflects a portion of the passing air stream through the inlet opening 199 to jacket 189. The air enters the lower portion of jacket 189 of gas cleaning unit 148, entering the chamber 192. Spiral fin 188 causes an upward movement of the air in a circulating pattern around tube 151. As it circulates, the air draws heat from the walls of tube 151 transferred from hot gases and entrained particulate matter passing therethrough. Heat is also transferred to the air in chamber 192 by spiral fin 188. The space between the inside wall of the jacket 189 and spiral fin 188 prevents heat transfer through the wall of jacket 189. When the heated air reaches the upper ends of gas cleaning units 148, 149, 150 it exits through the exhaust openings 210, 211, 212. It is then carried by the exhaust duct 207 to a desired location. For example, the air can be used to heat a room, heat water, or it can simply be exhausted.

Referrig to FIG. 13, a liquid, as water, can be dispensed into passage 129 above each of the openings 158 for purposes of cleaning, sanitizing, temperature control, fire extinguishing or the like. The liquid is dispensed through the nozzles 216, 217 and 218 mounted on the hood top wall 126. Each nozzle 216, 217, 218 is connected to a manifold or feed pipe 219 leading to a source of liquid under pressure. Pipe 219 is connected to suitable controls, including valves (not shown), wnhich can be operated to control the flow lf liquid in pipe 219. The liquid is subjected to pressure so that it flows through the nozles 216, 217 and 218 and is dispensed as a spray or mist into the passages 159 of tubes 151.

Use of the gas cleaning assembly is much like that as described with the embodiment shown in FIGS. 1 through 10. Gas moving means 144 is operated by motor 147 to move gas through the hood assembly 120 and discharge cleansed gas to a desired location. The gas is cleaned and heat is drawn from it as it is moved through the assembly. The gas, indicated by arrows 209 shown in FIG. 11, is moved from the space 123 above the grill 122 into passage 129 of hood assembly 120. The foreign matter is entrained in the gas and is moved with the gas through the opening 158 in the top wall 136 of fluid cleaning assembly 132.

Referring to FIG. 17, the gas moves down through the cylindrical passage 159 of tubes 151. Helical elements 161, 162 and 163, being oriented 90 degrees with respect to each other, divide the gas stream into separate gas streams. The gas is made to flow in spiral flow patterns subjecting the foreign matter carried by the gas to centrifugal forces causing the foreign matter to move outwardly against the cylindrical surface 152 of tube 151.

The gas moving through the passage 159 is at a temperature elevated above the atmospheric temperature due to the heat from the grill 122. Part of the heat and gas is transferred to the tube 151. This decreases the temperature of the gas and increases the temperature of the tube 151. Tube 151 is cooled by passing air in the chamber 192. When the particulates, water vapors, and the like approach in contact with the cool tube 151, they condense and merge into liquid droplets which are collected on the surface 152. Liquids and particles, along with the condensed liquid droplets, collect on the inside surface 152 and flow downwardly to material collector ring 179. The liquid droplets function as adhesive or collective agents which retain dry particulates that might be also entrained in the gas. Odor molecules, pollens and the like will also impinge and adhere to the collected liquid droplets.

Material collecting ring 179 functions to catch the collected foreign matter as it leaves the lower end of tube 151. Annular sheath of gas moves through the annular throat 182 between the inlet end or lip 181 of annular ring 179 and the lower edge 176 of tube 151. This accelerates the gas and carries collected matter 222 down into pocket 186 of ring 179. The collected matter, being liquid or semi-liquid, flows through the holes 187 and along the bottom wall 138 through the drain hole 139. Tube 151 carries the collected foreign matter to a collection container. As shown in FIG. 21, pocket 186 located between collecting ring 179 and lower end 177 of tube 151 increases in width from throat 182 causing a reduction in the speed of gas flow, which enhances the retention of foreign matter in pocket 186. The cooled and cleaned gas in the central portion of passage 159 flows through the center hole and ring 179 and is drawn by gas moving means 144 through exit passage 142 and discharged at a desired location.

Fan 197 driven by motor 198 delivers gas such as air to inlet duct 195 where it enters the jackets 189 of the gas cleaning units through inlet openings 199, 202, 205. The air moves through the gas cleaning unit, as the unit 148, in an upward spiral pattern, shown by the arrows 221 in FIG. 16, directed by the spiral fin 188. As the air moves over the outside surface of tube 151, it picks up heat from the tube 151 and the fine 188 thereby lowering the temperature of tube 151 and the gas in the passage 159. The heated air is carried by return duct 207 to a place of disposition. The air carried by return duct 207 is not contaminated and can be used for a suitable function.

The above disclosure comprises two embodiments of the gas cleaning unit of the invention, as incorporated in a cooking hood. The gas cleaning unit can be used with other apparatuses for accommodating gases, liquids, and like fluids and in other environments to remove foreign matter from the fluids. It is understood that changes in the materials, number of air cleaning units, and the size and length of the helical elements located in tubes 41 can be made by those skilled in the art without departing from the invention. The pitch and length of the helical elements can vary, as well as the number of helical elements that are placed in end-to-end or series in tubes 41. The angular relationship between adjacent ends of the helical elements can vary. Also, the angular positions of the opposite ends relative to each other of the helical elements can be altered. The invention is defined in the following claims.

The embodiments of the invention in which an exclusive property or privilege is claimed are defined as follows:

1. An apparatus for separating foreign matter from a hot gas and transferring heat from the gas to a fluid comprising: first means having a continuous uninterrupted fluid impervious heat conducting tubular wall surrounding a tubular passage, said wall having a gas inlet end and a gas outlet end aligned with the passage; second means located in the passage along the longitudinal length of the passage to direct gas and foreign matter flowing through said passage in a generally helical path extended from the gas inlet end to the gas outlet end thereof, said foreign matter entrained in the gas being collected on the inside surface of said wall, said collected foreign matter moving along said inside surface of said wall toward the gas outlet end; annular means fixed with respect to said tubular wall to collect foreign matter that moves from the outlet end and permit clean gas to pass centrally thereof; cylindrical jacket means surrounding the tubular wall providing a chamber for accommodating a fluid located in engagement with said tubular wall whereby heat from said tubular wall is transferred to said fluid, said jacket means having opposite ends secured to the first means adjacent the gas inlet and the tubular wall adjacent the gas outlet, spiral fin means surrounding and secured to the heat conducting tubular wall, said spiral fin means extended the length of said chamber and spaced from the jacket means providing said chamber with a spiral passage for carrying fluid and directing the flow of fluid around and along the length of the tubular wall whereby the tubular wall is cooled and the temperature of the gas in the passage adjacent the inside surface of the tubular wall is lowered to enhance condensation of gases into liquids which collect on said inside surface of the tubular wall, means for supplying fluid to one end of said chamber, and means for carrying fluid from the other end of said chamber to a desired location.

2. The apparatus of claim 1 including: a housing having a chamber, said housing having a top wall with a gas inlet opening; said first means being located in the chamber and mounted on said top wall, said tubular passage being longitudinally aligned with said gas inlet opening, said housing having a gas outlet opening, and means for drawing gas from said chamber through said gas outlet opening whereby gas flows through said tubular passage of the first means into said chamber, and means securing the first means and jacket means to said top wall.

3. The apparatus of claim 1 wherein: said second means comprises a plurality of helical elements, each helical element having a diameter substantially the same as the diameter of said tubular passage, said helical elements being located in end-to-end relation and having the same twist direction.

4. The apparatus of claim 3 wherein: each helical element has about 180 degree twist, each helical element terminating in an edge located circumferentially about 90 degrees relative to the leading edge of the adjacent helical element whereby when gas and foreign matter flows through said tubular passage, the gas and foreign matter is divided into separate streams at each leading edge of a helical element and follows a generally helical path during the flow thereof toward the gas outlet end.

5. The apparatus of claim 1 wherein: said jacket includes a sleeve surrounding the tubular wall, said sleeve being spaced outwardly from said tubular wall forming therewith said chamber, said sleeve having a fluid inlet at a first portion thereof and a fluid outlet at a second portion thereof whereby fluid introduced into said chamber circulates about said tubular wall in a spiral pattern induced by said spiral fin means.

6. The apparatus of claim 5 wherein: said spiral fin means is a continuous spiral fin having an outer peripheral edge spaced slightly from the inner surface of said sleeve.

7. An apparatus for separating foreign material from a hot gas and transferring heat from the hot gas to a fluid comprising: first means having a wall, said wall having opposite ends and a passage, and a gas inlet and a gas outlet surrounded by the opposite ends open to said passage, second means located in the passage to direct gas and foreign matter in a generally helical path into engagement with said wall, said foreign matter being collected on said wall, said collected foreign matter movable along said wall toward the gas outlet, third means fixed with respect to said wall to collect foreign matter that moves from said outlet of the passage and to permit clean gas to pass through said third means, fourth means including a jacket surrounding said wall providing a chamber accommodating a fluid located in engagement with said wall whereby heat from said hot gas in the passage is transferred through said wall to said fluid, spiral means located in said chamber and mounted on said wall for heat transfer from the wall to the fluid and to direct a spiral path of the fluid along the wall, whereby the wall is cooled and the temperature of the gas in the passage adjacent the inside surface of the wall is lowered to enhance condensation of gases into liquids which collect on said inside surface of the wall, and means for supplying fluid to one end of said chamber and carrying heated fluid from the other end of said chamber.

8. The apparatus of claim 7 wherein:
said jacket includes a side wall surrounding said wall of the first means, said side wall being spaced outwardly from said wall of the first means forming therewith said chamber, said spiral means providing a spiral passage around the wall of the first means for carrying said fluid in said chamber.

9. The apparatus of claim 8 wherein:
said side wall is slightly spaced from the spiral means.

10. The apparatus of claim 8 wherein:
said spiral means includes a continuous spiral fin located about and secured to said tube.

11. The apparatus of claim 7 wherein:

said first means is a tube having said passage, said tube having a circular open outlet end opened to said passage, said fourth means having end portions secured in relatively airtight relationship to said tube and a side wall surrounding and spaced from said tube and said spiral means, said end portions of side walls forming with said tube said chamber for accommodating a fluid.

12. The apparatus of claim 11 wherein:

said second means comprises a plurality of helical elements, each helical element having a diameter substantially the same as the diameter of the tubular passage, said helical elements being located in end-to-end relationship and having the same twist direction.

13. The apparatus of claim 11 wherein:

said spiral means comprises a continuous spiral fin disposed in circumferential relationship to said tube and secured to said tube.

* * * * *

UNITED STATES PATENT AND TRADEMARK OFFICE
CERTIFICATE OF CORRECTION

PATENT NO. : 4,382,807
DATED : May 10, 1983
INVENTOR(S) : Wolodymyr Diachuk

It is certified that error appears in the above-identified patent and that said Letters Patent is hereby corrected as shown below:

Column 1, line 29, "ags" should be -- gas --.

Column 5, line 31, "if" should be -- it --.

Column 8, line 65, "suitble" should be -- suitable --.

Column 9, line 2, "tight" should be -- inlet --.

Column 9, line 52, "Referrig" should be -- Referring --.

Column 9, line 60, "wnhich" should be -- which --.

Column 9, line 61, "1f" should be -- of --.

Column 9, line 63, "nozles" should be -- nozzles --.

Column 10, line 10, "tubes" should be -- tube --.

Column 10, line 61, "fine" should be -- fin --.

Signed and Sealed this

Twenty-sixth Day of July 1983.

[SEAL]

Attest:

GERALD J. MOSSINGHOFF

Attesting Officer     Commissioner of Patents and Trademarks